United States Patent
Pan et al.

(10) Patent No.: US 12,424,706 B2
(45) Date of Patent: Sep. 23, 2025

(54) ADHESIVE-COATED SEPARATOR FOR LITHIUM-ION BATTERIES, METHOD FOR PREPARING SAME, AND APPLICATIONS THEREOF

(71) Applicant: BYD COMPANY LIMITED, Guangdong (CN)

(72) Inventors: Yi Pan, Shenzhen (CN); Li Bai, Shenzhen (CN); Zeng Pan, Shenzhen (CN); Yan Zhu, Shenzhen (CN); Meng Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 744 days.

(21) Appl. No.: 17/624,477

(22) PCT Filed: Jul. 3, 2020

(86) PCT No.: PCT/CN2020/100170
§ 371 (c)(1),
(2) Date: Jan. 3, 2022

(87) PCT Pub. No.: WO2021/000945
PCT Pub. Date: Jan. 7, 2021

(65) Prior Publication Data
US 2022/0359952 A1    Nov. 10, 2022

(30) Foreign Application Priority Data
Jul. 3, 2019 (CN) .......................... 201910595330.2

(51) Int. Cl.
| | | |
|---|---|---|
| *H01M 50/46* | (2021.01) | |
| *H01M 10/0525* | (2010.01) | |
| *H01M 50/40* | (2021.01) | |
| *H01M 50/403* | (2021.01) | |
| *H01M 50/44* | (2021.01) | |
| *H01M 50/449* | (2021.01) | |

(52) U.S. Cl.
CPC ..... *H01M 50/461* (2021.01); *H01M 10/0525* (2013.01); *H01M 50/403* (2021.01); *H01M 50/449* (2021.01)

(58) Field of Classification Search
CPC ............. H01M 50/461; H01M 50/403; H01M 50/449; H01M 10/0525
See application file for complete search history.

(56) References Cited

U.S. PATENT DOCUMENTS

| 6,511,517 B1 | 1/2003 | Ullrich et al. |
|---|---|---|
| 2013/0288103 A1* | 10/2013 | Mizuno ...................... C08J 5/18 156/280 |
| 2015/0263325 A1* | 9/2015 | Honda ................ H01M 50/451 429/144 |
| 2019/0198840 A1 | 6/2019 | Huang et al. |

FOREIGN PATENT DOCUMENTS

| CN | 102569698 A | 7/2012 |
|---|---|---|
| CN | 103370196 A | 10/2013 |
| CN | 104389174 A | 3/2015 |
| CN | 105957996 A | 9/2016 |
| CN | 106410093 A | 2/2017 |
| CN | 108431108 A | 8/2018 |
| CN | 108711605 A | 10/2018 |
| CN | 108807792 A | 11/2018 |
| CN | 108819393 A | 11/2018 |
| CN | 108987651 A | 12/2018 |
| EP | 1047145 B1 | 7/2006 |
| JP | 2015506060 A | 2/2015 |
| JP | 2016522553 A | 7/2016 |
| JP | 2016143640 A | 8/2016 |
| KR | 1020130125357 A | 11/2013 |
| KR | 10-2014-0040043 A | 4/2014 |
| KR | 1020160133276 A | 11/2016 |
| WO | 2012060147 A1 | 5/2012 |
| WO | 2013159752 A1 | 10/2013 |
| WO | 2018139106 A1 | 8/2018 |

OTHER PUBLICATIONS

English Translation of International Search Report from PCT/CN2020/100170 dated Oct. 12, 2020 (3 pages).

* cited by examiner

*Primary Examiner* — Kenneth J Douyette
(74) *Attorney, Agent, or Firm* — Calfee, Halter & Griswold LLP

(57) ABSTRACT

An adhesive-coated separator for a lithium-ion battery, a preparation method thereof, and use thereof are disclosed. The adhesive-coated separator for a lithium-ion battery of the present disclosure includes a base membrane and an adhesive coating formed on a surface of the base membrane, the thickness deviation percentage of the adhesive coating is less than or equal to 10%, the thickness deviation percentage=$(D_{max}-D_{min})/D_{ave}\times 100\%$, $D_{max}$ is a maximum value of the thickness of the adhesive coating, $D_{min}$ is a minimum value of the thickness of the adhesive coating, and $D_{ave}$ is an average value of the thickness of the adhesive coating.

19 Claims, No Drawings

ADHESIVE-COATED SEPARATOR FOR LITHIUM-ION BATTERIES, METHOD FOR PREPARING SAME, AND APPLICATIONS THEREOF

CROSS-REFERENCE TO RELATED APPLICATIONS

The present application is the National Stage of international application of PCT/CN2020/100170 filed on Jul. 3, 2020, which further claims priority to Chinese Patent Application No. 201910595330.2, entitled "ADHESIVE-COATED SEPARATOR FOR LITHIUM-ION BATTERIES, METHOD FOR PREPARING SAME, AND APPLICATIONS THEREOF" filed with the China National Intellectual Property Administration on Jul. 3, 2019, which is incorporated by reference in its entirety.

FIELD

The present disclosure relates to the field of separators for lithium-ion batteries, and specifically, to an adhesive-coated separator for lithium-ion batteries, a preparation method thereof, and applications thereof.

BACKGROUND

The structure of an existing adhesive coating of separators enables an electrode plate and a separator to adhere together, thereby improving the formability of battery cores, that is, the hardness of battery cores. In addition, the adhesion of the electrode plate and the separator can significantly improve the flatness of the interface and prevent the battery cores from deformation. The existing adhesive-coated separator products inside batteries are mostly prepared from a liquid slurry system.

At present, an adhesive coating may be divided into a water-based coating and an oil-based coating. In addition, the adhesive coating includes continuous coating (such as full coating) and non-continuous coating (such as point coating and spraying).

SUMMARY

It was found by the present disclosure through many experiments that there occur accumulation and agglomeration of particles both for the water-based coating or the oil-based coating, and for continuous or non-continuous coating.

In addition, it was found in practice that the performance of the separators in the prior art does not meet the requirements of applications, there are many problems that need to be solved.

For an oil-based adhesive-coated separator, on the one hand, the oil-based adhesive coating is formulated with a chemical solvent, which causes serious environmental pollution and high costs; and on the other hand, the oil-based adhesive coating has pore-forming process complicated such that it is difficult in control, leading to non-availability of an adhesive coating with uniform pore size and distribution. Therefore, the adhesive coating of the oil-based adhesive-coated separator on the market has poor air permeability, with air permeability increment of more than 50 s (a Gurley value for 100 cc), and even more after hot pressing. This will seriously hinder the transmission of lithium ions through separator pores, causing substantial increase in the impedance of the battery and the ionic conductivity reduced by more than 5%, resulting in acceleration of polarization of the battery and influence on the cycle performance and rate performance of the battery.

For a water-based adhesive-coated separator, the water-based adhesive coating in a full-coated form fully covers the separator, which affects the air permeability of the separator, with air permeability increment of more than 50 s (a Gurley value for 100 cc) and even more after hot pressing, and the ionic conductivity reduced by more than 5%, thereby affecting the rate performance and cycle performance of the battery. And the water-based adhesive coating in a point-coated or sprayed form has a narrow process window and has poor consistency in the horizontal and cross-sectional direction of the separator. The horizontal distribution of the adhesive coating is not uniform after adhesive particles are agglomerated, thereby seriously affecting the consistency of the separator. The significant deviation of the air permeability across the adhesive coating provides the transmission inconsistency of lithium ions through the separator, resulting in significant fluctuations in ion conductivity with a difference up to 100%. A number of safety hazards, such as lithium plating, are derived from local polarization of the battery. In addition, it is difficult to control the adhesive coating in thickness having a wide fluctuation range of 1-10 µm on the same separator, which makes it difficult to ensure the bonding strength between the separator and the electrode plate, and has a great impact on the quality control and performance of the separator and the battery.

An objective of the present disclosure is to address the issues on serious environmental pollution and poor consistency of an adhesive-coated separator in the related art, and to provide an environmentally friendly and highly consistent adhesive-coated separator for a lithium-ion battery, a preparation method thereof, and applications thereof.

According to a first aspect of the present disclosure, an adhesive-coated separator for a lithium-ion battery is provided, including a base membrane and an adhesive coating formed on a surface of the base membrane; a thickness deviation percentage of the adhesive coating is less than or equal to 10%; the thickness deviation percentage=$(D_{max} - D_{min})/D_{ave} \times 100\%$; the $D_{max}$ is a maximum value of the thickness of the adhesive coating; the $D_{min}$ is a minimum value of the thickness of the adhesive coating; and the $D_{ave}$ is an average value of the thickness of the adhesive coating.

According to an embodiment of the present disclosure, the thickness deviation percentage of the adhesive coating is 0% to 8%.

According to an embodiment of the present disclosure, a difference between an air permeability value of the adhesive-coated separator and an air permeability value of the base membrane is 0 s/100 cc to 20 s/100 cc.

According to an embodiment of the present disclosure, a difference between the air permeability value of the adhesive-coated separator and the air permeability value of the base membrane is 0 s/100 cc to 15 s/100 cc.

According to an embodiment of the present disclosure, a difference between an ionic conductivity of the base membrane and an ionic conductivity of the adhesive-coated separator is 0 S/cm to $10^{-5}$ S/cm.

According to an embodiment of the present disclosure, the adhesive coating includes a resin; and the resin is from one or more of polyethylene oxide, polyethylene wax, polypropylene oxide, polyetherimide, polyvinylidene fluoride, vinylidene fluoride copolymer, polyacrylonitrile, poly(methyl (meth)acrylate), acrylate copolymer, or aramid.

According to an embodiment of the present disclosure, the resin is one or more of polyethylene oxide, polyvinylidene fluoride, or poly(methyl (meth)acrylate).

According to an embodiment of the present disclosure, the adhesive coating is continuously distributed.

According to an embodiment of the present disclosure, the adhesive coating is discontinuously distributed.

According to an embodiment of the present disclosure, the base membrane is one or more of a polyolefin membrane, a nonwoven fabric, or a polyimide membrane; or the base membrane is a composite membrane with a ceramic coating formed on the polyolefin membrane, the nonwoven fabric, or the polyimide membrane.

According to an embodiment of the present disclosure, an average thickness of the base membrane is 3 µm to 72 µm.

According to an embodiment of the present disclosure, an average thickness of the adhesive coating is 50 nm to 100 µm.

According to an embodiment of the present disclosure, an average thickness of the adhesive coating is 80 nm to 10 µm.

According to a second aspect of the present disclosure, a method for preparing an adhesive-coated separator for a lithium-ion battery is provided, including coating a resin powder on a surface of a base membrane by electrostatic powder spraying without solvents to form an adhesive coating on the surface of the base membrane.

According to an embodiment of the present disclosure, the method includes coating the resin powder on one side of the base membrane by electrostatic powder spraying, or coating the resin powder on both sides of the base membrane by electrostatic powder spraying.

According to an embodiment of the present disclosure, the adhesive coating is continuously distributed.

According to an embodiment of the present disclosure, the adhesive coating is discontinuously distributed.

According to an embodiment of the present disclosure, the resin powder is one or more of polyethylene oxide, polyethylene wax, polypropylene oxide, polyetherimide, polyvinylidene fluoride, vinylidene fluoride copolymer, polyacrylonitrile, poly(methyl (meth)acrylate), acrylate copolymer, or aramid.

According to an embodiment of the present disclosure, the resin powder is one or more of polyethylene oxide, polyvinylidene fluoride, or poly(methyl (meth)acrylate).

According to an embodiment of the present disclosure, a particle size D50 of the resin powder is 50 nm to 50 µm.

According to an embodiment of the present disclosure, a particle size D50 of the resin powder is 80 nm to 5 µm.

According to an embodiment of the present disclosure, the base membrane is one or more of a polyolefin membrane, a nonwoven fabric, or a polyimide membrane; or the base membrane is a composite membrane with a ceramic coating formed on the polyolefin membrane, the nonwoven fabric, or the polyimide membrane.

According to an embodiment of the present disclosure, an average thickness of the base membrane is 3 µm to 72 µm.

According to an embodiment of the present disclosure, an average thickness of the adhesive coating is 50 nm to 100 µm.

According to an embodiment of the present disclosure, an average thickness of the adhesive coating is 80 nm to 10 µm.

According to an embodiment of the present disclosure, the electrostatic powder spraying is performed with a spraying rate of 0.05-500 g/min, a moving speed of the base membrane of 2-500 m/min, a spraying distance of 10-30 cm, and a spraying voltage of 10-30 kV.

According to an embodiment of the present disclosure, the electrostatic powder spraying is performed with a spraying rate of 0.1-300 g/min, a moving speed of the base membrane of 5-300 m/min, a spraying distance of 15-25 cm, and a spraying voltage of 15-25 kV.

According to an embodiment of the present disclosure, after the coating of the resin powder on a surface of a base membrane by the electrostatic powder spraying, the method further includes hot pressing the base membrane formed with the adhesive coating.

According to an embodiment of the present disclosure, a hot pressing temperature is 30-120° C. and a hot pressing time is 2-300 s.

According to an embodiment of the present disclosure, after the hot pressing of the base membrane formed with the adhesive coating, the method further includes removing static electricity from the hot pressed base membrane.

According to a third aspect of the present disclosure, a lithium-ion battery is provided, including the foregoing adhesive-coated separator for a lithium-ion battery or the adhesive-coated separator for a lithium-ion battery obtained by the foregoing method.

The adhesive-coated separator for a lithium-ion battery according to the present disclosure has the advantages of environmental protection and high consistency, so that the bonding strength between the separator and the electrode plate can be ensured, thereby reducing the impact of the separator on the quality control and performance of the battery.

Additional aspects and advantages of the present disclosure will be given in the following description, some of which will become apparent from the following description or may be learned from practices of the present disclosure.

DETAILED DESCRIPTION

The endpoints and any values of the ranges disclosed herein are not limited to the precise range or value, and such ranges or values should be understood to include values that are close to the ranges or values. For numerical ranges, the endpoint values of the various ranges, the endpoint values of the various ranges and the individual point values, and the individual point values can be combined with one another to yield one or more new numerical ranges, and these numerical ranges should be considered as specifically disclosed herein.

To make the technical problems to be resolved by the present disclosure, technical solutions, and beneficial effects more comprehensible, the following further describes the present disclosure in detail with reference to the embodiments. It should be understood that the embodiments described herein are merely used for explaining the present disclosure instead of limiting the present disclosure.

In the present disclosure, the "thickness of adhesive coating" refers to the thickness of the adhesive-coated part, that is, only the thickness of the adhesive-coated part is determined.

According to a first aspect of the present disclosure, an adhesive-coated separator for a lithium-ion battery is provided (the adhesive-coated separator is also referred to as the separator in the following). The adhesive-coated separator for a lithium-ion battery includes a base membrane and an adhesive coating formed on the surface of the base membrane; a thickness deviation percentage of the adhesive coating is less than or equal to 10%; the thickness deviation percentage=$(D_{max}-D_{min})/D_{ave}\times 100\%$; the $D_{max}$ is a maximum value of the thickness of the adhesive coating; the $D_{min}$ is a minimum value of the thickness of the adhesive coating; and the $D_{ave}$ is an average value of the thickness of the adhesive coating.

According to an embodiment of the present disclosure, the thickness deviation percentage of the adhesive coating is 0% to 8%. According to an embodiment of the present disclosure, the thickness deviation percentage of the adhesive coating is 0% to 5%. According to an embodiment of the present disclosure, the thickness deviation percentage of the adhesive coating is 0% to 3%. According to an embodiment of the present disclosure, the thickness deviation percentage of the adhesive coating is 0%. For example, the thickness deviation percentage of the adhesive coating may be 0%, 1%, 2%, 3%, 4%, 5%, 5.5%, 6%, 7%, or 8%.

In the present disclosure, the thickness deviation percentage of the adhesive coating is determined by the following method.

The thickness of the adhesive-coated separator is determined with reference to the national standard GB/T6672-2001. The resolution of a thickness gauge is not greater than 0.1 μm. The thickness value is measured at three points equidistantly as one group in the horizontal direction, and is measured every 200 mm for one group in the longitudinal direction, for a total of five groups, so as to obtain the thickness values of the adhesive-coated separator at 15 points.

A thickness of the adhesive coating is a thickness value of the adhesive-coated separator minus a corresponding thickness value of the base membrane, to obtain 15 thickness values of the adhesive coating. The average value of the 15 values is used as the average thickness value $D_{ave}$ of the adhesive coating, the maximum value from the 15 values is used as the maximum thickness value $D_{max}$ of the adhesive coating, the minimum value from the 15 values is used as the minimum thickness value $D_{min}$ of the adhesive coating, and then the thickness deviation percentage is calculated through the following formula.

Thickness deviation percentage=$(D_{max}-D_{min})/D_{ave}\times 100\%$

According to an embodiment of the present disclosure, an increased value of the air permeability value of the adhesive coating for the base membrane (that is, the difference between the air permeability value of the adhesive-coated separator and the air permeability value of the base membrane) is 0 s/100 cc to 20 s/100 cc. According to an embodiment of the present disclosure, the increased value of the air permeability value of the adhesive coating for the base membrane is 0 s/100 cc to 15 s/100 cc. According to an embodiment of the present disclosure, the increased value of the air permeability value of the adhesive coating for the base membrane is 0 s/100 cc to 10 s/100 cc. According to an embodiment of the present disclosure, the increased value of the air permeability value of the adhesive coating for the base membrane is 0 s/100 cc to 5 s/100 cc. According to an embodiment of the present disclosure, the increased value of the air permeability value of the adhesive coating for the base membrane is 0 s/100 cc to 2 s/100 cc.

For example, the increased value of the air permeability value of the adhesive coating for the base membrane may be 0 s/100 cc, 1 s/100 cc, 2 s/100 cc, 3 s/100 cc, 4 s/100 cc, 5 s/100 cc, 6 s/100 cc, 7 s/100 cc, 8 s/100 cc, 9 s/100 cc, 10 s/100 cc, 11 s/100 cc, 12 s/100 cc, 13 s/100 cc, 14 s/100 cc, 15 s/100 cc, 16 s/100 cc, 17 s/100 cc, 18 s/100 cc, 19 s/100 cc, or 20 s/100 cc.

In the present disclosure, the increased value of the air permeability value of the adhesive coating for the base membrane is determined according to the following steps.

1) Determination of Air Permeability Value of Base Membrane

A piece of base membrane is cut every 150 mm in the longitudinal direction for a total of three pieces. The piece size is 100 mm×100 mm for a base membrane with a width ≥100 mm. The piece size is 100 mm×base membrane width for a base membrane with a width <100 mm. The air permeability determination is carried out on the base membrane with a test head of an air permeability tester within an air volume of 100 cc. The air permeability value is measured every 20 mm for one group in the longitudinal direction, for a total of 15 air permeability values in five groups. The average value of the 15 air permeability values is used as the air permeability value of the base membrane.

2) Determination of Air Permeability Value of Adhesive-Coated Separator

A piece of adhesive-coated separator is cut every 150 mm in the longitudinal direction for a total of three pieces. The piece size is 100 mm×100 mm for a separator with a width ≥100 mm. The piece size is 100 mm×separator width for a separator with a width <100 mm. The air permeability determination is carried out on the separator with a test head of an air permeability tester within an air volume of 100 cc. The air permeability value is measured every 20 mm for one group in the longitudinal direction, for a total of 15 air permeability values in five groups. The average value of the 15 air permeability values is used as the air permeability value of the adhesive-coated separator.

3) Calculation of Increased Value of Air Permeability Value of Adhesive Coating

Increased value of air permeability value of adhesive coating for base membrane=air permeability value of adhesive-coated separator−air permeability value of base membrane According to an embodiment of the present disclosure, the decreased value of the ionic conductivity of the adhesive coating for the base membrane (that is, the difference between the ionic conductivity of the base membrane and the ionic conductivity of the adhesive-coated separator) is 0 S/cm to $10^{-5}$ S/cm. According to an embodiment of the present disclosure, the decreased value of the ionic conductivity of the adhesive coating for the base membrane is 0 S/cm to $0.2\times 10^{-5}$ S/cm. According to an embodiment of the present disclosure, the decreased value of the ionic conductivity of the adhesive coating for the base membrane is 0 S/cm to $0.1\times 10^{-5}$ S/cm. According to an embodiment of the present disclosure, the decreased value of the ionic conductivity of the adhesive coating for the base membrane is 0 S/cm to $0.03\times 10^{-5}$ S/cm.

In the present disclosure, the decreased value of the ionic conductivity of the adhesive coating for the base membrane is calculated through the following formula.

Decreased value of ionic conductivity of adhesive coating for base membrane=ionic conductivity of base membrane−ionic conductivity of adhesive-coated separator According to an embodiment of the present disclosure, to further improve the consistency of the separator, the adhesive coating includes a resin; and the resin is one or more of polyethylene oxide, polyethylene wax, polypropylene oxide, polyetherimide, polyvinylidene fluoride, vinylidene fluoride copolymer, polyacrylonitrile, poly(methyl (meth)acrylate), acrylate copolymer, or aramid. According to an embodiment of the present disclosure, the resin is one or more of polyethylene oxide, polyvinylidene fluoride, or poly(methyl (meth)acrylate).

According to an embodiment of the present disclosure, the adhesive coating may be continuously distributed or may be discontinuously distributed.

According to an embodiment of the present disclosure, the base membrane may be made of various materials commonly used for a base membrane in the art. According to an embodiment of the present disclosure, the base membrane is one or more of a polyolefin membrane, a nonwoven fabric, or a polyimide membrane; or the base membrane is a composite membrane with a ceramic coating or a functional coating formed on the polyolefin membrane, the nonwoven fabric, or the polyimide membrane.

For example, the ceramic coating may be a coating formed by aluminum oxide or boehmite.

For example, the functional coating may be a high-temperature resistant coating such as aramid, or may be an ionic coating.

According to an embodiment of the present disclosure, an average thickness of the base membrane is 3 μm to 72 μm, such as 3 μm, 3.1 μm, . . . , 71.9 μm, or 72 μm. According to an embodiment of the present disclosure, the average thickness of the base membrane is 6 μm to 32 μm. According to an embodiment of the present disclosure, the average thickness of the base membrane is 6 μm to 25 μm.

According to an embodiment of the present disclosure, an average thickness of the adhesive coating may be 50 nm to 100 μm, such as 50 nm, 51 nm, . . . , 99 μm, or 100 μm. According to an embodiment of the present disclosure, the average thickness of the adhesive coating may be 50 nm to 10 μm. According to an embodiment of the present disclosure, the average thickness of the adhesive coating may be 80 nm to 10 μm. The functional performance of the base membrane with an adhesive coating having an average thickness within the foregoing range can be optimally improved. In addition, if the average thickness of the adhesive coating is less than 50 nm, the functional performance thereof cannot be fully utilized; and if the average thickness of the adhesive coating is greater than 100 μm, an excessively large thickness leads to redundant functional performance and excessively large volume, resulting in the reduction of the energy density of the battery.

According to a second aspect of the present disclosure, a method for preparing an adhesive-coated separator for a lithium-ion battery is provided. The method includes coating a resin powder on a surface of a base membrane by electrostatic powder spraying to form an adhesive coating on the surface of the base membrane.

In the present disclosure, the electrostatic powder spraying is a method of directly coating a resin powder on a surface of a base membrane without solvents to form an adhesive coating on the surface of the base membrane.

According to an embodiment of the present disclosure, to further improve the consistency of the separator, the resin is one or more of polyethylene oxide, polyethylene wax, polypropylene oxide, polyetherimide, polyvinylidene fluoride, vinylidene fluoride copolymer, polyacrylonitrile, poly(methyl (meth)acrylate), acrylate copolymer, or aramid. According to an embodiment of the present disclosure, the resin is one or more of polyethylene oxide, polyvinylidene fluoride, or poly(methyl (meth)acrylate).

According to an embodiment of the present disclosure, a particle size D50 of the resin powder is 50 nm to 50 μm, such as 50 nm, 51 nm, . . . , 49 μm, or 50 μm. According to an embodiment of the present disclosure, the particle size D50 of the resin powder is 50 nm to 5 μm. According to an embodiment of the present disclosure, the particle size D50 of the resin powder is 80 nm to 5 μm. The particle size of the resin powder less than 50 nm leads to resin selection difficulty and small application window. The particle size of the resin powder greater than 50 μm affects the thickness and the comprehensive properties such as the ionic conductivity of the separator.

According to an embodiment of the present disclosure, the base membrane may be made of various materials commonly used for a base membrane in the art. According to an embodiment of the present disclosure, the base membrane is one or more of a polyolefin membrane, a nonwoven fabric, or a polyimide membrane; or the base membrane is a composite membrane with a ceramic coating or a functional coating formed on the polyolefin membrane, the nonwoven fabric, or the polyimide membrane.

For example, the ceramic coating may be a coating formed by aluminum oxide or boehmite.

For example, the functional coating may be a high-temperature resistant coating such as aramid, or may be an ionic coating.

According to an embodiment of the present disclosure, an average thickness of the base membrane is 3 μm to 72 μm, such as 3 μm, 3.1 μm, . . . , 71.9 μm, or 72 μm. According to an embodiment of the present disclosure, the average thickness of the base membrane is 6 μm to 32 μm. According to an embodiment of the present disclosure, the average thickness of the base membrane is 6 μm to 25 μm.

According to an embodiment of the present disclosure, an average thickness of the adhesive coating may be 50 nm to 100 μm, such as 50 nm, 51 nm, . . . , 99 μm, or 100 μm. According to an embodiment of the present disclosure, the average thickness of the adhesive coating may be 50 nm to 10 μm. According to an embodiment of the present disclosure, the average thickness of the adhesive coating may be 80 nm to 10 μm. The functional performance of the base membrane with an adhesive coating having an average thickness within the foregoing range can be optimally improved. In addition, if the average thickness is less than 50 nm, the functional performance thereof cannot be fully utilized; and if the average thickness is greater than 100 μm, an excessively large thickness leads to redundant functional performance and excessively large volume, resulting in the reduction of the energy density of the battery.

In the present disclosure, the adhesive-coated separator is obtained based on the principle of electrostatic powder spraying. Specifically, for the electrostatic powder spraying, a spray gun for electrostatic powder spraying and a resin powder therein are connected to a negative electrode, and a workbench and a base membrane thereon are connected to a positive electrode and the ground, so that an electrostatic field is formed between the tip of the spray gun and the base membrane at a high voltage of a power supply. The electric field force to the resin powder is directly proportional to the voltage of the electrostatic field and the charge quantity of the powder, and is inversely proportional to the distance between the spray gun and the base membrane. An air ionization region is formed surrounding the spray gun carrying a sufficiently high voltage to form strong corona discharge in the air. The resin powder is charged by contacting the edge of an electrode needle at the tip of the spray gun when sprayed from the spray gun, and has core charges increased on its surface when passing through the air ionization region provided by corona discharge. The negatively charged powder moves to the surface of the base membrane under the electrostatic field, and is uniformly deposited on the surface of the base membrane.

According to an embodiment of the present disclosure, the electrostatic powder spraying is performed with spraying rate of 0.05-500 g/min, such as 0.05 g/min, 0.06 g/min, 499.99 g/min, or 500 g/min, a moving speed of the base membrane of 5-500 m/min, such as 5 m/min, 6 m/min, ..., 499 m/min, or 500 m/min, a spraying distance of 10-30 cm, such as 10 cm, 11 cm, ..., 29 cm, or 30 cm, and a spraying voltage of 10-30 kV, such as 10 kV, 10.1 kV, ..., 29.9 kV, or 30 kV. According to an embodiment of the present disclosure, the electrostatic powder spraying is performed with a spraying rate of 1-300 g/min, a moving speed of the base membrane of 5-300 m/min, a spraying distance of 15-25 cm, and a spraying voltage of 15-25 kV.

Herein, the "moving speed of base membrane" refers to a speed of the base membrane moving in a spraying region, and the "spraying distance" refers to a distance between the base membrane and the tip of the spray gun.

According to an embodiment of the present disclosure, a charged base membrane is placed between grounded longitudinal plates, a dry resin powder with an opposite charge to the base membrane is filled into a powder tank of an electrostatic powder spraying system, and two spray guns with spray heads parallel to the longitudinal plates are fixed on both sides of the base membrane respectively; the electrostatic powder spraying system is started, the spray guns are activated with a spraying rate of 0.05-500 g/min while the base membrane is rolled at a speed of 5-500 m/min, with the spraying distance set at 10-30 cm and the spraying voltage set at 10-30 kV, and then the resin powder is attached to the base membrane under the electric field force.

According to an embodiment of the present disclosure, the resin powder may be coated on one side or both sides of the base membrane by electrostatic powder spraying. In addition, the adhesive coating formed on the base membrane may be continuously distributed or may be discontinuously distributed.

According to an embodiment of the present disclosure, after the coating a resin powder on a surface of a base membrane by electrostatic powder spraying, the method further includes hot pressing the base membrane formed with the adhesive coating. The hot pressing makes it possible to effectively fix the adhesive coating on the base membrane, ensure the bonding strength of the adhesive-coated separator in applications, and ensure the performance optimization of the adhesive-coated separator in applications.

According to an embodiment of the present disclosure, a hot pressing temperature is 30-120° C. and a hot pressing time is 2-300 s. For example, the hot pressing temperature is 30° C., 31° C., ..., 119° C., or 120° C., and the hot pressing time is 2 s, 3 s, ..., 299 s, or 300 s.

According to an embodiment of the present disclosure, after hot pressing of the base membrane formed with the adhesive coating, the method further includes removing static electricity from the hot pressed base membrane. The removal of static electricity can prevent potential safety hazards caused by static electricity accumulation.

The method for removing static electricity is not specifically limited, for example, the static electricity may be removed from the base membrane by using a static eliminator bar or an ionizing bar.

The method for preparing an adhesive-coated separator for a lithium-ion battery according to the present disclosure has the following advantages. The thickness deviation percentage (less than 10%) of the same adhesive coating is low; the increased value of the air permeability value of the adhesive coating for the base membrane is small, which is about 0 s/100 cc to 20 s/100 cc; the increased value of the air permeability value of the adhesive coating for the base membrane after hot pressing is 0 s/100 cc to 20 s/100 cc; the decreased value of the ionic conductivity of the adhesive coating for the base membrane is less than 0 S/cm to 10-5 S/cm; the battery rate performance is consistent with the performance of the adhesive-coated separator at different rates; and the cycle performance of the adhesive-coated separator is better than that of the base membrane.

Compared with an oil-based coating of a conventional adhesive-coated separator, the method for preparing an adhesive-coated separator for a lithium-ion battery according to the present disclosure avoids the use of chemical solvents, which is friendly to environment; and involves electrostatic powder spraying to achieve the uniform distribution of the adhesive coating on the base membrane by the control of electrostatic field voltage, spraying distance, moving speed, etc., thereby addressing issue on difficulty in pore-forming process of the oil-based coating.

Compared with a water-based coating of a conventional adhesive-coated separator, the method for preparing an adhesive-coated separator for a lithium-ion battery according to the present disclosure avoids physical agglomeration of microparticles by designing and selecting solid powder particles and by ensuring that the solid powder particles carry the same kind of electric charge through static electricity, so that the particles of the adhesive coating can be freely designed to provide a single layer or multiple layers of particles dispersed in the base membrane, thereby enabling the controllable design and uniform distribution in both the horizontal and cross-sectional directions of the base membrane.

In the method for preparing an adhesive-coated separator for a lithium-ion battery according to the present disclosure, the resin powder particles carry the same kind of electric charge by electrostatic powder spraying, avoiding physical agglomeration of microparticles, so that the resin powder is effectively controlled, and the single particles can be attached to the surface of the base membrane, to finally provide lithium ions with normal transmission channels having high consistency and low polarization within a battery core. This can meet the requirements of batteries in electrical performance, especially the rate performance and long cycle life, while ensuring the bonding of the base membrane.

According to a third aspect of the present disclosure, a lithium-ion battery is provided. The lithium-ion battery includes the foregoing adhesive-coated separator for a lithium-ion battery or the adhesive-coated separator for a lithium-ion battery obtained by the foregoing method. It should be noted that the features and advantages described above for the adhesive-coated separator for a lithium-ion battery and the preparation method thereof are also applicable to the lithium-ion battery, and details are not described herein again.

The present disclosure is described with reference to the following examples. It should be noted that these examples are merely illustrative and are not intended to limit the present disclosure in any way.

Example 1

(1) A polyvinylidene fluoride resin from Arkema was pulverized and sieved with a sieve to control a particle size D50 to 80 nm, and then dried.

(2) A positively charged polyethylene base membrane (purchased from Suzhou Greenpower New Energy Materials Co., Ltd.) with an average thickness of 6 μm was placed between grounded longitudinal plates, the dried polyvinylidene fluoride resin powder with an opposite charge to the base membrane was filled into a powder tank of an electrostatic solid-powder spraying system, and two spray guns with spray heads parallel to the longitudinal plates were fixed on both sides of the base membrane respectively.

(3) The electrostatic powder spraying system was started, the spray guns were activated with a spraying rate set at 1 g/min while the base membrane was rolled at a speed of 5 m/min, with the spraying distance set at 15 cm and the spraying voltage set at 15 kV, and then the resin powder was attached to the base membrane under the electric field force.

(4) Hot pressing through a roller: the base membrane with the resin powder attached to it was rolled at 60° C. to ensure the bonding between the resin powder and the base membrane.

(5) Removal of static electricity: the static electricity was removed from the base membrane by using a static eliminator bar to obtain a separator having an adhesive coating with an average thickness of 80 nm.

Example 2

(1) Poly(methyl (meth)acrylate) from Dow was pulverized and sieved with a sieve to control a particle size D50 to 5 μm, and then dried.

(2) A positively charged polyethylene ceramic base membrane (purchased from Suzhou Greenpower New Energy Materials Co., Ltd., composed of a polyethylene base with an average thickness of 12 μm and an aluminum oxide coating with an average thickness of 3 μm coated on the surface of the base) with a thickness of 15 μm was placed between grounded longitudinal plates, the dried poly(methyl (meth)acrylate) resin powder with an opposite charge to the base membrane was filled into a powder tank of an electrostatic solid-powder spraying system, and two spray guns with spray heads parallel to the longitudinal plates were fixed on both sides of the base membrane respectively.

(3) The electrostatic powder spraying system was started, the spray guns were activated with a spraying rate set at 300 g/min while the base membrane was rolled at a speed of 300 m/min, with the spraying distance set at 25 cm and the spraying voltage set at 25 kV, and then the resin powder was attached to the base membrane under the electric field force.

(4) Hot pressing through a roller: the base membrane with the resin powder attached to it was rolled at 90° C. to ensure the bonding between the resin powder and the base membrane.

(5) Removal of static electricity: the static electricity was removed from the base membrane by using a static eliminator bar to obtain a separator having an adhesive coating with an average thickness of 10 μm.

Example 3

(1) A polyethylene oxide resin from BASF was pulverized and sieved with a sieve to control a particle size D50 to about 2 and then dried.

(2) A positively charged polypropylene base membrane (purchased from Cangzhou Mingzhu Plastic Co., Ltd.) with an average thickness of 25 μm was placed between grounded longitudinal plates, the dried resin powder with an opposite charge to the base membrane was filled into a powder tank of an electrostatic solid-powder spraying system, and two spray guns with spray heads parallel to the longitudinal plates were fixed on both sides of the base membrane respectively.

(3) The electrostatic powder spraying system was started, the spray guns were activated with a spraying rate set at 100 g/min while the base membrane was rolled at a speed of 100 m/min, with the spraying distance set at 20 cm and the spraying voltage set at 20 kV, and then the resin powder was attached to the base membrane under the electric field force.

(4) Hot pressing through a roller: the base membrane with the resin powder attached to it was rolled at 35° C. to ensure the bonding between the resin powder and the base membrane.

(5) Removal of static electricity: the static electricity was removed from the base membrane by using a static eliminator bar to obtain a separator having an adhesive coating with an average thickness of 4 μm.

Example 4

(1) A polyacrylonitrile resin from BAK was pulverized and sieved with a sieve to control a particle size D50 to 50 nm, and then dried.

(2) A positively charged polyethylene base membrane (purchased from Suzhou Greenpower New Energy Materials Co., Ltd.) with a thickness of 12 μm was placed between grounded longitudinal plates, the dried resin powder with an opposite charge to the base membrane was filled into a powder tank of an electrostatic solid-powder spraying system, and two spray guns with spray heads parallel to the longitudinal plates were fixed on both sides of the base membrane respectively.

(3) The electrostatic powder spraying system was started, the spray guns were activated with a spraying rate set at 0.06 g/min while the base membrane was rolled at a speed of 3 m/min, with the spraying distance set at 28 cm and the spraying voltage set at 28 kV, and then the resin powder was attached to the base membrane under the electric field force.

(4) Hot pressing through a roller: the base membrane with the resin powder attached to it was rolled at 35° C. to ensure the bonding between the resin powder and the base membrane.

(5) Removal of static electricity: the static electricity was removed from the base membrane by using a static eliminator bar to obtain a separator having an adhesive coating with an average thickness of 50 nm.

Comparative Example 1

Oil-Based Comparative Group

An adhesive-coated separator was prepared from the same raw materials as in Example 1. The difference is that the preparation method in this comparative example adopts dip coating. The preparation is specifically as follows:

1) Polyvinylidene fluoride from Arkema was ground and sieved to obtain a resin powder with D50 of 80 nm, and then the resin powder was dissolved in an N-methyl-2-pyrrolidone (NMP) solvent and then stirred uniformly to obtain a coating slurry with a solid content of 20 wt %.

2) A polyethylene base membrane (purchased from Suzhou Greenpower New Energy Materials Co., Ltd.) with an average thickness of 6 μm was dipped in the coating slurry by dip coating with a coating speed of 10 m/min and a coating amount of 0.5 g/m².

3) The base membrane with the coating obtained in step 2) was dried in an oven at 60° C. to obtain an adhesive-coated separator.

Comparative Example 2

Water-Based Spraying Comparative Group

The same resin powder and base membrane as in Example 2 were used. The method in this comparative example adopts water-based rotary spraying. The preparation is specifically as follows:

1) A poly(methyl (meth)acrylate) resin from Dow was ground and sieved to obtain a resin powder with D50 of 5 μm, and then the resin powder was mixed with deionized water and then stirred uniformly to obtain a coating slurry with a solid content of 35 wt %.

2) The coating slurry was sprayed on a surface of a polyethylene ceramic base membrane (purchased from Suzhou Greenpower New Energy Materials Co., Ltd., composed of a polyethylene base membrane with an average thickness of 12 μm and an aluminum oxide coating with an average thickness of 3 μm coated on the surface of the polyethylene base membrane) with a thickness of 15 μm by using a water-based rotary spray gun with a coating speed of 25 m/min and a coating amount of 1 g/m².

3) The base membrane with the coating obtained in step 2) was dried in an oven at 90° C. to obtain an adhesive-coated separator.

Comparative Example 3

Water-Based Roll Coating Comparative Group

1) Polyethylene oxide from BAK was mixed with deionized water to form a coating slurry with a solid content of 35 wt %.

2) The coating slurry was coated on a surface of a polypropylene base membrane (purchased from Cangzhou Mingzhu Plastic Co., Ltd.) with a thickness of 25 μm by using a micro gravure roller with a coating speed of 30 m/min and a coating amount of 0.8 g/m².

3) The base membrane with the coating obtained in step 2) was dried in an oven at 35° C. to obtain an adhesive-coated separator.

Comparative Example 4

An adhesive-coated separator was prepared with the same resin powder and base membrane as in Example 1. The difference is that the adhesive-coated separator was prepared by electrostatic liquid-powder spraying in this comparative example.

1) A polyvinylidene fluoride resin from Arkema was pulverized and sieved with a sieve to control a particle size D50 to 80 nm, and then mixed with deionized water and then stirred uniformly to obtain a coating slurry with a solid content of 35 wt %.

2) A positively charged polyethylene base membrane (purchased from Suzhou Greenpower New Energy Materials Co., Ltd.) with an average thickness of 6 μm was placed between grounded longitudinal plates, the coating slurry with an opposite charge to the base membrane was filled into a storage tank of an electrostatic liquid-powder spraying system, and two spray guns with spray heads parallel to the longitudinal plates were fixed on both sides of the base membrane respectively.

3) The electrostatic liquid-powder spraying system was started, the spray guns were activated with a spraying rate set at 3 g/min while the base membrane was rolled at a speed of 5 m/min, with the spraying distance set at 15 cm, the spraying voltage set at 15 kV, and the atomization pressure set at 0.1 MPa, and then the slurry was attached to the base membrane under the electric field force.

4) Hot pressing through a roller: the base membrane with the resin attached to it was rolled at 60° C. to ensure the bonding between the slurry and the base membrane.

5) Removal of static electricity: the static electricity was removed from the base membrane by using a static eliminator bar to obtain an adhesive-coated separator.

Test Example 1

The base membranes before coating and the adhesive-coated separators in Examples 1-4 and Comparative Examples 1-4 were tested by the following methods. The results are shown in Table 1.

1) Thickness Deviation

The thickness of the adhesive-coated separator was determined with reference to the national standard GB/T6672-2001. The resolution of a thickness gauge was not greater than 0.1 μm. The thickness value was measured at three points equidistantly as one group in the horizontal direction, and was measured every 200 mm for one group in the longitudinal direction, for a total of five groups, so as to obtain the thickness values of the adhesive-coated separator at 15 points.

A thickness of the adhesive coating is a thickness value of the adhesive-coated separator minus a corresponding thickness value of the base membrane, to obtain 15 thickness values of the adhesive coating. The average value of the 15 values was used as the average thickness value $D_{ave}$ of the adhesive coating, the maximum value from the 15 values was used as the maximum thickness value $D_{max}$ of the adhesive coating, the minimum value from the 15 values was used as the minimum thickness value $D_{min}$ of the adhesive coating, and then the thickness deviation percentage was calculated through the following formula.

$$\text{Thickness deviation percentage} = (D_{max} - D_{min})/D_{ave} \times 100\%$$

2) Air Permeability Value of Base Membrane

A piece of base membrane was cut every 150 mm in the longitudinal direction for a total of three pieces. The piece size was 100 mm×100 mm for a base membrane with a width ≥100 mm. The piece size was 100 mm×base membrane width for a base membrane with a width <100 mm. The air permeability determination was carried out on the base membrane with a test head of an air permeability tester within an air volume of 100 cc. The air permeability value was measured every 20 mm for one group in the longitudinal direction, for a total of 15 air permeability values in five groups. The average value of the 15 air permeability values was used as the air permeability value of the base membrane.

3) Air Permeability Value of Adhesive-Coated Separator

A piece of adhesive-coated separator was cut every 150 mm in the longitudinal direction for a total of three pieces. The piece size was 100 mm×100 mm for a separator with a width ≥100 mm. The piece size was 100 mm×separator width for a separator with a width <100 mm. The air permeability determination was carried out on the separator with a test head of an air permeability tester within an air volume of 100 cc. The air permeability value was measured every 20 mm for one group in the longitudinal direction, for a total of 15 air permeability values in five groups. The average value of the 15 air permeability values was used as the air permeability value of the adhesive-coated separator.

4) Increased Value of Air Permeability Value of Adhesive Coating

Increased value of air permeability value of adhesive coating for base membrane=air permeability value of adhesive-coated separator−air permeability value of base membrane 5) Ionic Conductivity A separator was cut into four pieces with the same size, and was soaked into 1 mol/L of $LiPF_6$ in EC:EMC:DMC=1:1:1 electrolyte in a sealed state for 2 h. The separators having layers of various numbers were sequentially put in pouch batteries and then sealed. AC impedances of four separators having different layer numbers were respectively tested. The number of separator layers as the abscissa was plotted against the separator resistance as the ordinate, and the slope and linear fit of the curve were determined. The ionic conductivity of the separator was calculated according to formula 1 and formula 2 when the linear fit was greater than 0.99; and the test was restarted when the linear fit was less than 0.99.

$$R = k \times 1 \quad \text{Formula 1}$$

R represents a resistance value of a single-layer separator; and k represents a slope of the curve with a linear fit greater than 0.99.

$$\sigma = d/(R \times S) \quad \text{Formula 2}$$

σ represents an ionic conductivity of the separator in S/cm;

d represents a thickness of the separator;

R represents a resistance value of the separator; and

S represents an area of the separator.

The tests were carried out for 15 groups in parallel.

6) Discharge Capacity Retention Rate at 5 C (%)

A square battery with a capacity of 50 Ah was made using lithium-nickel-manganese-cobalt-oxide as a positive electrode and using artificial graphite as a negative electrode. The battery was charged at 0.5 C to 4.2 V and discharged at 0.5 C to 2.5 V. The battery was then charged at 0.5 C to 4.2 V and discharged at 5 C to 2.5 V. The capacity at 5 C was divided by the capacity at 0.5 C to obtain the discharge capacity retention rate at 5 C.

7) Capacity Retention Rate Over 1000 Cycles

A square battery with a capacity of 50 Ah was made using lithium-nickel-manganese-cobalt-oxide as a positive electrode and using artificial graphite as a negative electrode. The test for charge and discharge cycle was carried out with a current at 1 C with a charge cut-off voltage of 4.2 V and a discharge cut-off voltage of 2.5 V. The 1000th discharge capacity was divided by the first charge capacity to obtain the capacity retention rate over 1000 cycles.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Base membrane | PE | PE + ceramic | PP | PE | PE | PE + ceramic | PP | PE |
| Ionic conductivity of base membrane ($\times 10^{-4}$ S/cm) | 3.002 | 5.146 | 6.032 | 4.893 | 4.893 | 5.146 | 6.032 | 3.002 |
| Air permeability value of base membrane (s/100 cc) | 130 | 270 | 270 | 230 | 230 | 270 | 270 | 130 |
| Resin powder | PVDF | PMMA | Polyethylene oxide | Polyacrylonitrile | PVDF | PMMA | Polyethylene oxide | PVDF |
| Coating method | Electrostatic powder spraying | Electrostatic powder spraying | Electrostatic powder spraying | Electrostatic powder spraying | Dip coating | Rotary spraying | Roll coating | Electrostatic spraying |
| Raw material system | Solid powder | Solid powder | Solid powder | Solid powder | Oil-based slurry | Water-based slurry | Water-based slurry | Water-based slurry |
| Thickness of adhesive coating | 81 nm | 9.8 μm | 3.91 μm | 49.5 nm | 2 μm | 0 μm | 0 μm | 0 μm |
|  | 80 nm | 9.5 μm | 3.85 μm | 48.3 nm | 2.1 μm | 10 μm | 0 μm | 0.5 μm |
|  | 76 nm | 10.3 μm | 4.02 μm | 51 nm | 2.3 μm | 1 μm | 1 μm | 0.5 μm |
|  | 80 nm | 10.2 μm | 4.07 μm | 51.2 nm | 1.5 μm | 2 μm | 1 μm | 0.5 μm |
|  | 81 nm | 9.7 μm | 3.99 μm | 48.9 nm | 1.8 μm | 9 μm | 6 μm | 0.5 μm |
|  | 82 nm | 10 μm | 4.01 μm | 51.3 nm | 1.9 μm | 10 μm | 5 μm | 0.5 μm |
|  | 78 nm | 9.9 μm | 4 μm | 49.5 nm | 2.2 μm | 1 μm | 1 μm | 1 μm |
|  | 80 nm | 10.0 μm | 3.99 μm | 49.6 nm | 2 μm | 2 μm | 1 μm | 1 μm |
|  | 79 nm | 10.1 μm | 4.00 μm | 50.5 nm | 1.9 μm | 9 μm | 6 μm | 1 μm |
|  | 82 nm | 9.8 μm | 3.92 μm | 51 nm | 1.9 μm | 10 μm | 1 μm | 4.5 μm |
|  | 78 nm | 9.6 μm | 3.92 μm | 51.2 nm | 1.9 μm | 1 μm | 6 μm | 4.5 μm |
|  | 80 nm | 10.3 μm | 4.02 μm | 48.9 nm | 2.3 μm | 2 μm | 5 μm | 4.5 μm |
|  | 79 nm | 10.2 μm | 4.08 μm | 51.3 nm | 2 μm | 9 μm | 1 μm | 5 μm |
|  | 81 nm | 10.4 μm | 4.09 μm | 49 nm | 2.2 μm | 1 μm | 1 μm | 5 μm |
|  | 82 nm | 10.1 μm | 4.08 μm | 48.8 nm | 2.3 μm | 1 μm | 5 μm | 5 μm |
| Average thickness value $D_{ave}$ of adhesive coating | 80 nm | 10 μm | 4 μm | 50 nm | 2 μm | 5 μm | 2 μm | 2 μm |

TABLE 1-continued

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Thickness deviation $D_{max} - D_{min}$ of adhesive coating | 6 nm | 0.8 μm | 0.22 μm | 3 nm | 0.8 μm | 10 μm | 6 μm | 6 μm |
| Thickness deviation percentage of adhesive coating (%) | 7.5 | 8 | 5.5 | 6 | 40.1 | 201 | 258 | 300 |
| Difference between air permeability value of adhesive-coated separator and air permeability value of base membrane (s/100 cc) | 5 | 8 | 2 | 2 | 200 | 100 | 200 | 196 |
| Difference between ionic conductivity of base membrane and ionic conductivity of adhesive-coated separator ($\times 10^{-4}$ S/cm) | 0.003 | 0.01 | 0.02 | 0.01 | 2 | 3 | 2 | 2 |
| Discharge capacity retention rate at 5 C. (%) | 98.2 | 98.3 | 98.5 | 95 | 87 | 85 | 80 | 81 |
| Capacity retention rate over 1000 cycles (%) | 91.3 | 91.2 | 91.5 | 89 | 85 | 86 | 30 | 32 |

It can be learned from Table 1 that, compared with the oil-based comparative group, the water-based spraying comparative group, and the water-based full coating comparative group in the related art, the adhesive-coated separator obtained by the method of the present disclosure has a significantly low thickness deviation percentage of the same adhesive coating, a significantly small increased value of the air permeability value of the adhesive coating for the base membrane, a significantly small decreased value of the ionic conductivity of the adhesive coating for the base membrane, a high discharge capacity retention rate at 5 C, and a high capacity retention rate over 1000 cycles.

The implementations of the present disclosure are described in detail above, but the present disclosure is not limited to the specific details in the foregoing implementations. Various simple variations may be made to the technical solutions of the present disclosure within the scope of the technical idea of the present disclosure, and such simple variations shall all fall within the protection scope of the present disclosure.

It should be further noted that the specific technical features described in the foregoing specific implementations may be combined in any suitable manner without contradiction. To avoid unnecessary repetition, various possible combinations are not further described in the present disclosure.

In addition, various different implementations of the present disclosure may alternatively be combined randomly. Such combinations should also be considered as the content disclosed in the present disclosure provided that these combinations do not depart from the concept of the present disclosure.

In the descriptions of this specification, descriptions using reference terms "an embodiment", "some embodiments", "an example", "a specific example", or "some examples" mean that specific characteristics, structures, materials, or features described with reference to the embodiment or example are included in at least one embodiment or example of the present disclosure. In this specification, schematic representations of the foregoing terms are not necessarily directed to the same embodiment or example. Moreover, the specific features, structures, materials, or characteristics described may be combined in any one or more embodiments or examples in a suitable manner. In addition, different embodiments or examples described in this specification, as well as features of different embodiments or examples, may be integrated and combined by a person skilled in the art without contradicting each other.

Although the embodiments of the present disclosure have been shown and described above, it can be understood that, the foregoing embodiments are exemplary and cannot be understood as limitation to the present disclosure. A person of ordinary skill in the art can make changes, modifications, replacements, or variations to the foregoing embodiments within the scope of the present disclosure.

What is claimed is:

1. An adhesive-coated separator for a lithium-ion battery, comprising a base membrane and an adhesive coating formed on a surface of the base membrane; wherein a thickness deviation percentage of the adhesive coating is less than or equal to 10%; the thickness deviation percentage=$(D_{max}-D_{min})/D_{ave}\times 100\%$; the $D_{max}$ is a maximum value of the thickness of the adhesive coating; the $D_{min}$ is a minimum value of the thickness of the adhesive coating; and the $D_{ave}$ is an average value of the thickness of the adhesive coating,
wherein the adhesive coating comprises a resin; and the resin is one or more of polyethylene oxide, polypropylene oxide, polyetherimide, polyvinylidene fluoride, vinylidene fluoride copolymer, polyacrylonitrile, poly(methyl (meth)acrylate), and acrylate copolymer.

2. The adhesive-coated separator for a lithium-ion battery according to claim 1, wherein the thickness deviation percentage of the adhesive coating is 0% to 8%.

3. The adhesive-coated separator for a lithium-ion battery according to claim 1, wherein a difference between an air permeability value of the adhesive-coated separator and an air permeability value of the base membrane is 0 s/100 cc to 20 s/100 cc.

4. The adhesive-coated separator for a lithium-ion battery according to claim 1, wherein a difference between an ionic conductivity of the base membrane and an ionic conductivity of the adhesive-coated separator is 0 S/cm to $10^{-5}$ S/cm.

5. The adhesive-coated separator for a lithium-ion battery according to claim 1, wherein the base membrane is one or more of a polyolefin membrane, a nonwoven fabric, or a polyimide membrane; or
the base membrane is a composite membrane with a ceramic coating formed on the polyolefin membrane, the nonwoven fabric, or the polyimide membrane.

6. The adhesive-coated separator for a lithium-ion battery according to claim 1, wherein an average thickness of the base membrane is 3 μm to 72 μm.

7. The adhesive-coated separator for a lithium-ion battery according to claim 1, wherein the average thickness of the adhesive-coated layer is 50 nm to 100 μm.

8. A method for preparing the adhesive-coated separator for a lithium-ion battery according to claim 1, comprising coating a resin powder on a surface of a base membrane by electrostatic powder spraying to form an adhesive coating on the surface of the base membrane.

9. The method according to claim 8, comprising coating the resin powder on one side of the base membrane by electrostatic powder spraying, or coating the resin powder on both sides of the base membrane by electrostatic powder spraying.

10. The method according to claim 8, wherein the resin powder is one or more of polyethylene oxide, polyethylene wax, polypropylene oxide, polyetherimide, polyvinylidene fluoride, vinylidene fluoride copolymer, polyacrylonitrile, poly(methyl (meth)acrylate), and acrylate copolymer.

11. The method according to claim 8, wherein a particle size D50 of the resin powder is 50 nm to 50 μm.

12. The method according to claim 8, wherein the base membrane is one or more of a polyolefin membrane, a nonwoven fabric, or a polyimide membrane; or
the base membrane is a composite membrane with a ceramic coating formed on the polyolefin membrane, the nonwoven fabric, or the polyimide membrane.

13. The method according to claim 8, wherein an average thickness of the base membrane is 3 μm to 72 μm.

14. The method according to claim 8, wherein an average thickness of the adhesive coating is 50 nm to 100 μm.

15. The method according to claim 8, wherein the electrostatic powder spraying is performed with a spraying rate of 0.05-500 g/min, a moving speed of the base membrane of 2-500 m/min, a spraying distance of 10-30 cm, and a spraying voltage of 10-30 kV.

16. The method according to claim 8, after the coating of the resin powder on the surface of a base membrane by the electrostatic powder spraying, the method further comprising: hot pressing the base membrane formed with the adhesive coating.

17. The method according to claim 16, wherein a hot pressing temperature is 30-120° C. and a hot pressing time is 2-300 s.

18. The method according to claim 16, after the hot pressing of the base membrane formed with the adhesive coating, the method further comprising: removing static electricity from the hot pressed base membrane.

19. A lithium-ion battery, comprising the adhesive-coated separator for a lithium-ion battery according to claim 1.

* * * * *